C. W. RICE.
APPARATUS FOR PURIFYING WATER FOR USE IN STEAM BOILERS.
APPLICATION FILED SEPT. 26, 1911.
1,035,813.
Patented Aug. 13, 1912.
2 SHEETS—SHEET 1.
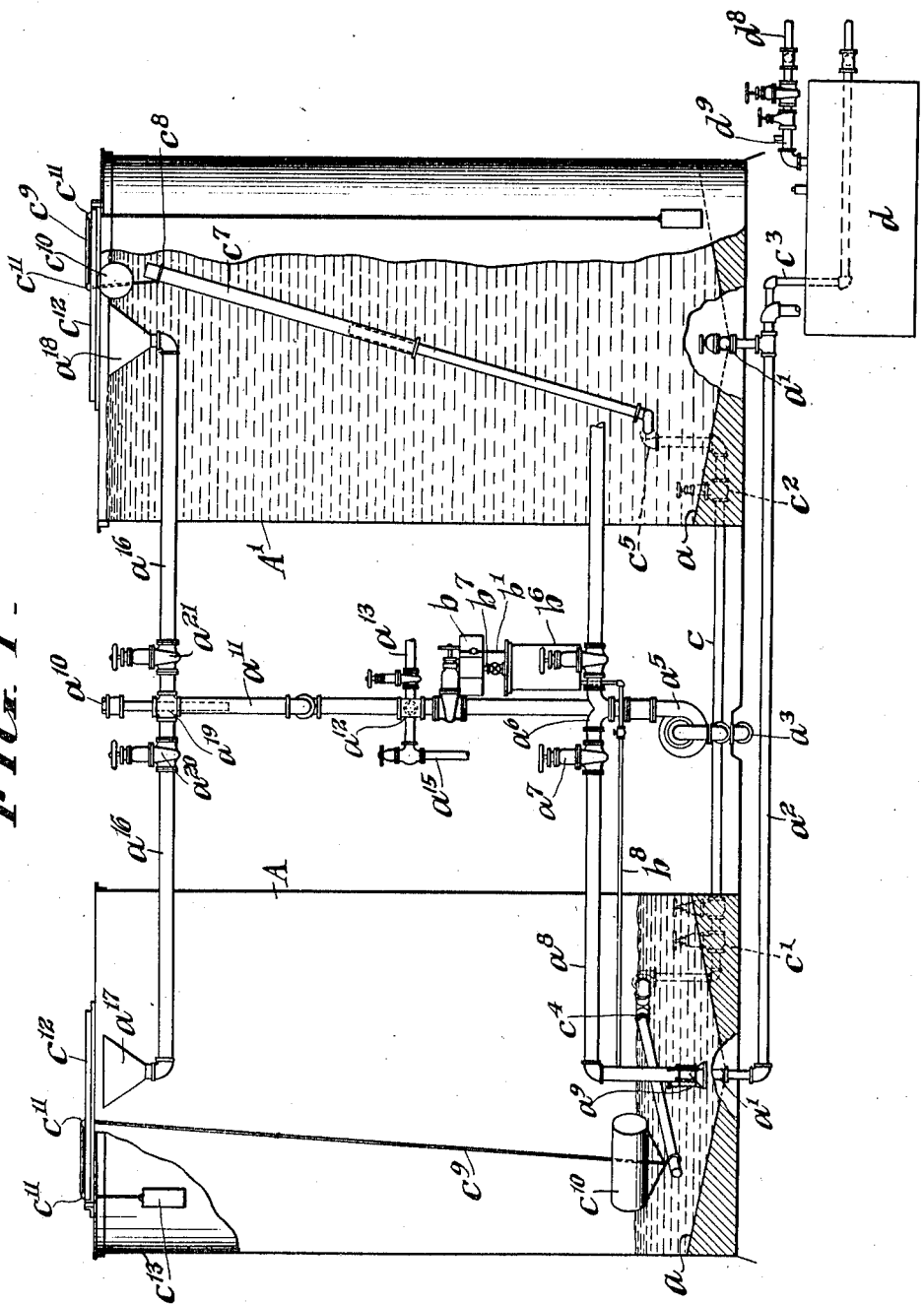
WITNESSES
Thomas M. Smith
Helen J. Miller.
INVENTOR
Cyrus W. Rice,
BY
J. Walter Douglass
ATTORNEY

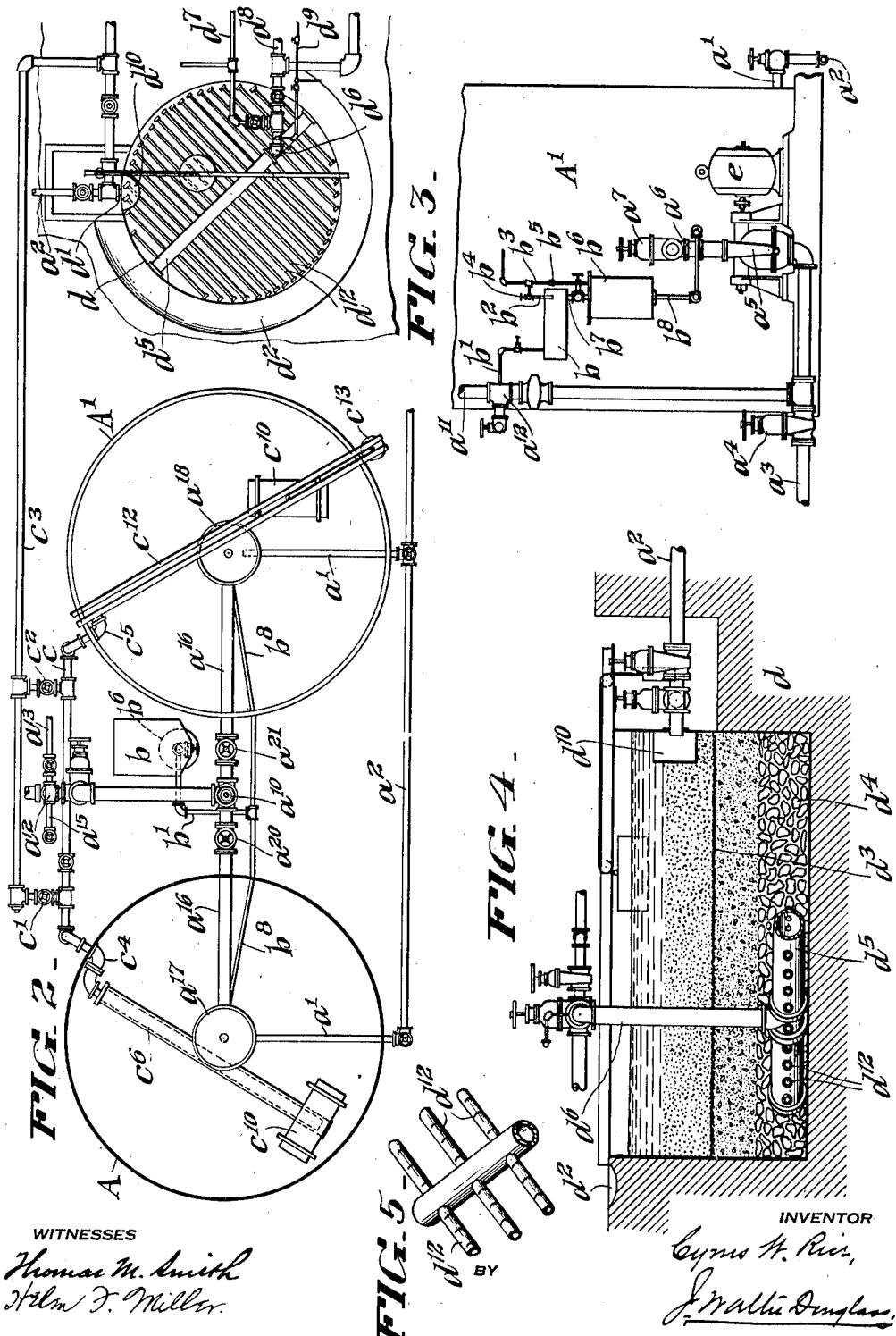

UNITED STATES PATENT OFFICE.

CYRUS W. RICE, OF PHILADELPHIA, PENNSYLVANIA.

APPARATUS FOR PURIFYING WATER FOR USE IN STEAM-BOILERS.

1,035,813.     Specification of Letters Patent.     Patented Aug. 13, 1912.

Original application filed May 10, 1911, Serial No. 626,275. Divided and this application filed September 26, 1911. Serial No. 651,367.

*To all whom it may concern:*

Be it known that I, CYRUS W. RICE, a citizen of the United States, residing at the city of Philadelphia, in the county of Philadelphia and State of Pennsylvania, have invented certain new and useful Improvements in an Apparatus for Purifying Water for Use in Steam-Boilers, of which the following is a specification.

My invention relates to apparatus for the conduction of an intermittent system of purifying water primarily for use in steam boilers; the water being brought to such a condition as to be free from scale-forming and other deleterious impurities.

This application is a division of an application Serial No. 626,275, filed by me under date of May 10th, 1911.

The purification of water for the purposes set forth as well as other uses of the same is mainly effected in a tank by chemical action occurring upon raw water by a solution, composed of lime and soda caustic, which solution is introduced into the tank with the raw water at the start of filling. Purification is further aided by circulation of the treated water from near the top into the bottom of the tank and by aeration induced by such circulation of the water.

The most universally used system for removing scale forming or similar deleterious matter from water to adapt it for use in boilers has been to employ a tank with paddles arranged so as to agitate the water. This system in practical use concentrated its mechanical actions mainly upon the water confined to near the bottom of the tank and thus in only a meager degree did such action effect liberation of the aforementioned objectionable foreign matter from the water.

The principal objects of my present invention are first, to provide an efficient apparatus, wherein the commingling of raw water and its contained carbonic acid gas ($CO_2$), with a double caustic solution, of lime and soda, can be accomplished at about where the raw water is introduced into a tank so as to form with the caustic soda, new carbonates of soda in sufficient quantity for reducing the permanent hardness of the raw water, the caustic lime in the double caustic introduction completing the temporary hardness; second, to provide an apparatus in which thorough mechanical action and complete chemical action of a double caustic, in solution, are had upon the raw water; third, to provide apparatus whereby the old precipitate, which has previously been agitated from the bottom of the tank, and the newly formed precipitate shall rapidly settle to the bottom of the tank; and fourth, to provide an effective apparatus for removing from the treating tank precipitates such as organic matter, oil or other accumulations detrimental if used in steam boilers or for other purposes.

On account of the reaction of calcium carbonate ($CaCO_3$) and caustic soda ($NaOH$) resulting from the combined introduction of sodium carbonate ($Na_2CO_3$) and calcium hydrate ($Ca(OH)_2$) separate receptacles and intervals are required for their introduction into the treating tank. The double caustic method not only simplifies the introductions, but reduces to a minimum the errors of the addition of larger quantities of commercial lime usually of uncertain composition. In the paddle system so much in vogue the final treatment of soda ash is on filled tanks. In this circulating system, raw water from preferably a (centrifugal) pump is discharged against the center of an inverted cone-shaped bottom of the tank and directly into a mass of old precipitates, elements absolutely necessary to the proper clarification and separation of new chemical precipitates and foreign matter of the water.

By the mode of circulations and induced air agitations, permitted in conjunction with the double caustic treatment, far greater volumes of raw water can be more thoroughly treated chemically and completely than in previously employed practical systems. In the double caustic method there is but one single chemical introduction into the pump discharge at the start of supplying raw water to a treating tank. There is thus presented on the bottom of a treating tank and at the start of filling a strong solution of treating chemicals against which is discharged the raw water from the pump and through which all the raw water must pass.

The raw water discharge is continued in this manner until it overflows over the top of each treating tank. The mode of filling is here changed to one of circulation. The water is then drawn from the bottom of the overflow through a circulating pipe by preferably the suction of a centrifugal pump and discharged then centrally about the cone-shaped bottom of the tank. In the act of circulating water from the overflow a vacuum is produced in the circulating pipe. This vacuum in the circulating pipe is relieved automatically by the entrance of air through an aspirator located on the circulating pipe outside of a treating tank in about the same horizontal position, as the overflow.

The position of the vacuum and overflow at a height above the suction of the pump is important for a proper entrainment of air with the circulating water and for the intimate commingling of the air with the circulating water. The water thus treated due to air agitation and circulation undergoes complete chemical changes; and the latter being effected by the double caustic upon the water and which also in conjunction with the circulation of the water, aiding in the mechanical precipitation of such foreign matter.

According to my invention, I provide an apparatus whereby the water forces the old precipitates to the top of the tank, which latter may be of variable height so as to permit the same to readily overflow into returning induced circulations of the tank to thus cause a more thorough intermingling of these old precipitates with the treating water in gathering body and size prior to final precipitation of such matter into the bottom of the tank and away from the settled water of such tank as well as hastening the settling of the thus treated water in delivery to filters for final clarification.

In conveying the settled water to the filters for clarification there is employed preferably a telescoping outlet pipe with counterweight and float for automatically regulating discharges of the settled water to the filters for final clarification of the same. Before opening a tank of settled water through the floating telescoping outlet pipe to a filter a cross-over pipe between the outlets of the floating outlet pipe in their connection to pipes running to the filters is opened from the treated water tank into another tank treating water to flush precipitates or foreign matter therefrom and that have gathered in the telescoping floating outlet pipe of the treated tank, to thus prevent entrance of same into the filter to an extent to interfere with the subsequent clarifications of the water delivered thereto. The final filtration step is to clarify or remove suspended matter not previously removed in the settling tank, for ultimate utilization thereof.

The general nature and scope of my present invention will be more fully understood from the following description taken in connection with the accompanying drawings forming part hereof, in which—

Figure 1, is a sectional elevation of a pair of settling tanks and a filter with accessories thereof. Fig. 2, is a view in plan of the two settling tanks with their accessories and a cross-sectional view of a filtering bed. Fig. 3, is a side elevational view of one of the settling tanks and some of the auxiliary apparatus. Fig. 4, is a longitudinal sectional view of one of the series of filtering beds, showing the outlet therefrom for the clarified water to a boiler; and Fig. 5, is a perspective view partly in section of the false bottom, comprising notched pipes with a central manifold to lead off water.

Referring to the drawings A and $A^1$, are two connected open top water settling tanks, each provided on the inside with an inclining bottom $a$, and with a central discharge pipe $a^1$, which is connected to a sewer conduit $a^2$.

$a^3$, is a raw or contaminated water admission conduit having a stop-valve $a^4$, as clearly shown in Fig. 3, and beyond the said valve by means of a piping is provided a centrifugal pump $a^5$.

$a^6$, is a piping from the centrifugal pump $a^5$, provided with a stop-valve $a^7$.

$a^8$, is a piping which is extended downwardly and terminates preferably in a footvalve $a^9$, located centrally above the inclining bottom $a$. The piping $a^8$, extends into the tank $A^1$, as it does into the tank A, see Fig. 1. When the tank A, is in active service, the stop-valve $a^7$, of the piping $a^8$, to the tank $A^1$, is shut off. The piping $a^{11}$, in the upper portion is provided with a vacuum valve $a^{10}$. This piping is designated as the circulating and agitating pipe line. This line $a^{11}$, is provided with a T-connection $a^{12}$, with which is connected a flushing-valved pipe $a^{13}$, and a sewer-valved pipe $a^{15}$. The circulating and agitating pipe line $a^{11}$, is connected with the main water admission conduit $a^3$, to the right of the stop-valve $a^4$, as shown in Fig. 3. Cross circulating water pipes $a^{16}$, extend into both of the tanks A and $A^1$, near the top and terminate in upturned funnels $a^{17}$ and $a^{18}$. The cross-circulating pipes $a^{16}$, are provided with stop-valves $a^{20}$ and $a^{21}$, and a union connection $a^{19}$, connected with the vertical pipe line $a^{11}$, as shown in Fig. 1.

An open container $b$, for chemicals is provided with a water pipe $b^1$, and a branch steam pipe $b^2$, from a steam supply pipe $b^3$, having respectively stop-valves $b^4$ and $b^5$. Beneath the container $b$, is arranged a delivery tank $b^6$, for receiving the dissolved chemicals of the container $b$, through a pipe $b^7$. From the delivery tank $b^6$, a discharge pipe $b^8$, leads to and terminates in the piping $a^8$, as clearly shown to the left in Fig. 1.

A controlled cross-piping $c$, from the tank A, to the tank $A^1$, is provided for flushing the telescoping tubing $c^6$ and $c^7$, having stop-valves $c^1$ and $c^2$. The piping $c^3$, conducts the purified water from either of the settling tanks A or $A^1$, to a distant filtering media bed or beds $d$, wherein the water is clarified prior to being discharged through a piping $d^8$, for use.

The piping $c$, by elbow joints $c^4$ and $c^5$, in both tanks A and $A^1$, is flexibly connected with the telescoping floating outlet pipes $c^6$ and $c^7$, having at one end of each a collar $c^8$, with which is connected a chain $c^9$, and float $c^{10}$. The chain passes over pulleys $c^{11}$, in a framing $c^{12}$, arranged above the tanks and the opposite end of the chain carries a weight $c^{13}$. The treated water in either tank A or $A^1$, rising therein enables the float $c^{10}$, to control the action of the flexibly jointed telescoping piping $c^3$ and $c^7$, in assuming its inclined vertical position, such as shown to the right in Fig. 1, from the position it occupied when the tank was practically empty, as shown to the left in Fig. 1, and correspondingly the weight $c^{13}$, is lowered as the water rises in the tank A or $A^1$, aided by the float $c^{10}$, carried up with the increasing volume of water of such tank.

The filtering media bed $d$, is provided at the top with a shallow trough $d^2$, as shown in Fig. 4, for the overflow of water thereinto and which may be connected with the sewer conduit $a^2$, as shown in Fig. 1, by a suitable pipe connection, not shown. This bed $d$, may be arranged as shown in Fig. 4, having sand or other filtering matter placed on a wire grating $d^3$. Beneath the same is arranged coarser matter, as gravel or other filtering media $d^4$, and on the bottom of the bed is arranged a false bottom, composed of notched-piping $d^{12}$, covering the entire area of the bed $d$, as clearly shown in Fig. 5. The piping $d^{12}$, is connected with a central manifold $d^5$, having a vertical piping $d^6$, and valve branches $d^7$, $d^8$ and $d^9$, for respectively, back-flushing the filter $d$; leading off clarified water to a common suction for a boiler, not shown; and for admitting air into the filter, as desired, as clearly shown in Fig. 5. The treated and settled water from the tanks A and $A^1$, is first led by way of the pipe line $c^3$, into the box $d^{10}$, provided in the sand or like matter apartment of the filter From the box $d^{10}$, it passes over the layer of filtering sand of the filter $d$, and is then drawn by the action of the boiler feed pump, not shown, through first the filtering sand and then through the coarser matter of the filter $d$, the notched piping $d^{12}$, and manifold $d^5$, into a suction pipe $d^8$, and thence to the boiler, not shown.

$e$, is an electric or other type of motor for actuating preferably the centrifugal pump $a^5$. As both tanks A and $A^1$, are exactly alike, the description has been confined to but one. The filtering-bed $d$, may be a series of such beds suitably connected for final clarification of the purified water, which has been freed of scale forming properties.

The raw water is introduced through the pipe $a^3$, by the action of the pump $a^5$. At the start of introducing the water into the tank A or $A^1$, chemicals are forced by either air or steam pressure from the chemical delivery tank $b^6$, through the line $b^8$, into the centrifugal pump discharge $a^8$. When the tank A or $A^1$, is filled with treated water to the overflow of funnel $a^{17}$ or $a^{18}$, the valve $a^4$ on the raw water supply $a^3$, is closed and the valve on the circulating pipe $a^{11}$, of the tank treating either $a^{20}$ or $a^{21}$, is opened and the caustic treated water is circulated by the action of the centrifugal pump $d^5$, through the said overflow circulating pipe $a^{11}$, and pump discharge $a^8$, into the cone-shaped bottom $a$, of the tank A or $A^1$. During the circulation of said water the vacuum created by such circulation is relieved by the entrance of air through the aspirator $a^{10}$. This intermingling of the air with the circulating water and their combined introduction at the bottom into the mass of sludge and precipitate, produces a mechanical and chemical action on the water which completely precipitates foreign matter as well as scale forming elements from the water treated.

The floating telescoping outlet pipe $c^6$ or $c^7$, is extended by the increasing volume of water in the tank A or $A^1$, into an inclined position as shown to the right in Fig. 1, and therewith the float $a^{10}$, rises to the top of the body of water and in which position of the said pipe the treated water when in a settled state is drained off into the filter $d$. It will be understood that the pump $a^5$, will have previously been shut off and also that the stop-valves $a^7$, to the pipes $a^6$ and $a^8$, and the water thus thoroughly aerated and previously under agitation is then allowed for a certain period of time to settle with scale forming elements of the water to sink into the inclined bottom $a$, of the tank A or $A^1$. At the same time any scum upon the body of water on the upper part of the tank is discharged through the funnel $a^{17}$, and piping $a^{16}$ and $a^{11}$, and stop-valve $a^{15}$, connected by piping to the sewer $a^2$, with of course the stop-valve $a^{21}$, and flushing valve $a^{13}$, being closed.

When a tank is nearly empty any over accumulations of precipitates on the bottom $a$, are flushed into the sewer-pipe $a^2$, through the valve $a^1$, connected therewith. Cleaning of the tank is effected by a supply of water under pressure through the valve $a^{13}$, when the valve $a^{15}$, has been closed. The water passing through the circulating pipes $a^{11}$ and $a^{16}$, and over the side of the funnel $a^{17}$, and falling from this height into the accumulations in the bottom $a$, are thus agitated and flushed into the sewer pipe $a^2$.

The filter beds $d$, as arranged and clearly shown in Fig. 4, can be effectively maintained in a cleanly condition as required, by the system of pipes provided for back flushing and aeration of the same when necessary, and as more fully shown in Fig. 5.

The advantages of introducing the double caustic solution at about the point of discharge of the raw water into the treating tank or its state of increasing volume in the tank insures a much more thorough commingling of the treating chemicals in concentrated solution with the raw water introductions thus enabling early formation of new carbonates of soda by the combination of carbonic acid gas ($CO_2$), in the raw water with the caustic soda of the chemical treating caustic. These early formations of new soda carbonates provide a reagent for the rapid precipitation of calcium sulfate, one of the causes of permanent hardness in raw water, as calcium carbonate. The value of soda carbonate in combination with caustic lime in a system involving circulation and induced aeration has been practically demonstrated alongside of systems of less chemical and mechanical activity and in which soda ash of commerce and lime are used as the water softening agents. In the described system no indications of late chemical reaction appear and no deposits of precipitate beyond the settling tanks as in the soda ash treatments of less intensity in which pipes leading the treated water from the filters are frequently heavily coated and almost closed with deposits of precipitate. This particularly is the case around hot water heaters and boilers. As most water supplies for these purposes are of moderate temperature the chemical action of soda-ash on calcium sulfate has usually been sluggish.

Having thus described the nature and objects of my invention, what I claim as new and desire to secure by Letters Patent is:—

In an apparatus of the character described, treating and settling tanks, a pump and pipe connections to each of said tanks, controllable telescoping outlet pipes in said tanks having a controllable cross-over pipe from one tank to the other in connection with said telescoping pipes, and a circulating pipe having sewer connections for surface discharges.

In witness whereof, I have hereunto set my signature in the presence of the two subscribing witnesses hereto.

CYRUS W. RICE.

Witnesses:
 THOMAS M. SMITH,
 J. WALTER DOUGLASS.